United States Patent
Marumoto

(10) Patent No.: US 8,137,815 B2
(45) Date of Patent: Mar. 20, 2012

(54) COLOR INTERLAYER FILM FOR LAMINATED GLASS, AND LAMINATED GLASS

(75) Inventor: Tadashi Marumoto, Koka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 829 days.

(21) Appl. No.: 10/584,625

(22) PCT Filed: Feb. 2, 2006

(86) PCT No.: PCT/JP2006/301751
§ 371 (c)(1),
(2), (4) Date: Aug. 14, 2006

(87) PCT Pub. No.: WO2006/092923
PCT Pub. Date: Sep. 8, 2006

(65) Prior Publication Data
US 2009/0162671 A1    Jun. 25, 2009

(30) Foreign Application Priority Data
Feb. 28, 2005 (JP) .................. 2005-054700

(51) Int. Cl.
*B32B 17/10* (2006.01)
*C03C 27/12* (2006.01)
*C08K 5/52* (2006.01)
*C08K 5/521* (2006.01)

(52) U.S. Cl. ........ 428/437; 428/436; 524/140; 524/141; 524/143

(58) Field of Classification Search .......... 428/436, 428/437; 524/140, 141, 143
See application file for complete search history.

(56) References Cited

U.S. PATENT DOCUMENTS

| | | | | |
|---|---|---|---|---|
| 3,841,890 | A | 10/1974 | Coaker et al. | 106/316 |
| 4,917,996 | A * | 4/1990 | Matsuzaka et al. | 430/567 |
| 5,487,939 | A | 1/1996 | Phillips et al. | 428/334 |
| 5,830,568 | A | 11/1998 | Kondo | 428/328 |
| 6,673,456 | B1 | 1/2004 | Kobata et al. | 428/437 |
| 2003/0054160 | A1 * | 3/2003 | Fisher et al. | 428/328 |
| 2004/0234778 | A1 | 11/2004 | Fukatani et al. | 428/426 |
| 2005/0181220 | A1 | 8/2005 | Kobata et al. | 428/426 |
| 2006/0019153 | A1 * | 1/2006 | Imachi et al. | 429/128 |
| 2006/0133978 | A1 * | 6/2006 | Williams et al. | 423/263 |

FOREIGN PATENT DOCUMENTS

| | | |
|---|---|---|
| EP | 1 698 599 A1 | 9/2006 |
| JP | 2001-302289 | 10/2001 |
| JP | 2003-261361 | 9/2003 |
| JP | 2005-187226 | 7/2005 |
| WO | 03-018502 | 3/2003 |

OTHER PUBLICATIONS

Database WPI Week 200416 Thomson Scientific, London, GB; AN 2004-160239 XP002517882.

* cited by examiner

*Primary Examiner* — D. S Nakarani

(74) *Attorney, Agent, or Firm* — Wenderoth, Lind & Ponack, L.L.P.

(57) ABSTRACT

The present invention provides a color interlayer film for laminated glass, comprised of a resin composition containing a polyvinyl acetal resin, a coloring agent, and an infrared ray shielding agent and characterized in that the resin composition further contains a phosphoric acid ester compound at a ratio of 5 parts by weight or less to 100 parts by weight of the polyvinyl acetal resin, and also provides laminated glass using said interlayer film. The interlayer film of the present invention has characteristics that the film is excellent in the infrared ray shielding property and resistant against whitening in the interlayer film part even in the case of absorbing moisture while keeping the basic properties as an interlayer film for laminated glass.

4 Claims, No Drawings

COLOR INTERLAYER FILM FOR LAMINATED GLASS, AND LAMINATED GLASS

FIELD OF THE INVENTION

The present invention relates to a color interlayer film for laminated glass, and laminated glass using said interlayer film for laminated glass.

BACKGROUND ART

Conventionally, laminated glass obtained by inserting an interlayer film of a polyvinyl butyral resin between at least two glass plates is excellent in transparency, weather resistance, adhesion strength, and penetration resistance and further provided with a capability of preventing scattering of glass debris as basic properties, and accordingly has been used widely for window glass of automobiles and buildings.

To heighten the beauty of laminated glass, laminated glass using a color interlayer film comprised of a polyvinyl acetal resin containing a coloring agent has also been used widely.

However, there is a fear that the color interlayer film may turn its color to white if the film is put in highly humid atmosphere, resulting in discoloration of its original color into white. Further, the color interlayer film is desired to have high transparency and there arises a problem that if the color interlayer film has a light ray transmittance exceeding 50%, even slight whitening discoloration tends to be noticeable. Therefore, it has been desired to develop a color interlayer film for laminated glass capable of preventing whitening of the color interlayer film and maintaining the original color of the color interlayer film, and laminated glass using the interlayer film.

DISCLOSURE OF THE INVENTION

Problems To Be Solved By The Invention

An object of the present invention is to provide a color interlayer film for laminated glass capable of maintaining basic properties as the color interlayer film for laminated glass, excellent in the infrared ray shielding property, and resistant to whitening of the interlayer film part even in the case of moisture absorption, and laminated glass using the interlayer film. Another object of the present invention is to provide a color interlayer film resistant to whitening and capable of keeping the original color, regardless of high transparency, and maintaining low infrared ray transmittance, and also provide laminated glass using the interlayer film.

Means for Solving the Problems

Inventors of the present invention have made various investigations to accomplish the above-mentioned purposes and have found that the above-mentioned problems are all solved by adding a phosphoric acid ester compound at a ratio of 5 parts by weight or less to 100 parts by weight of a polyvinyl acetal resin in a resin composition containing the polyvinyl acetal resin, a coloring agent, and an infrared ray shielding agent, and accordingly have completed the invention based on further investigations.

That is, the invention relates to:
(1) a color interlayer film for laminated glass, comprising a resin composition containing a polyvinyl acetal resin, a coloring agent, and an infrared ray shielding agent, characterized in that the resin composition further contains a phosphoric acid ester compound at a ratio of 5 parts by weight or less to 100 parts by weight of the polyvinyl acetal resin;
(2) the color interlayer film for laminated glass according to the above (1), wherein the phosphoric acid ester compound is a trialkyl phosphate, a trialkoxyalkyl phosphate, a triaryl phosphate, or an alkyl aryl phosphate;
(3) the color interlayer film for laminated glass according to the above (1), wherein the phosphoric acid ester compound is trioctyl phosphate, triisopropyl phosphate, tributoxyethyl phosphate, tricresyl phosphate, or isodecylphenyl phosphate;
(4) the color interlayer film for laminated glass according to any one of the above (1) to (3), wherein the content of the phosphoric acid ester compound is 0.001 to 5 parts by weight to 100 parts by weight of the polyvinyl acetal resin; and
(5) a laminated glass, characterized in that the color interlayer film for laminated glass according to any one of the above (1) to (4) intervenes between at least one pair of glass plates.

EFFECTS OF THE INVENTION

A color interlayer film for laminated glass of the present invention, and laminated glass using the film are excellent in an infrared ray shielding property and resistance against whitening while keeping basic properties as an interlayer film for laminated glasses or as a laminated glass. Also, the color interlayer film for laminated glass of the present invention and the laminated glass using the film have an effect which is excellent in an infrared ray shielding property and preventive against whitening while durably keeping original color even if they are highly transparent.

BEST MODES FOR CARRYING OUT THE INVENTION

The color interlayer film for laminated glass of the present invention is a color interlayer film for laminated glass, comprising a resin composition containing a polyvinyl acetal resin, a coloring agent, and an infrared ray shielding agent, and characterized in that the resin composition further contains a phosphoric acid ester compound at a ratio of 5 parts by weight or less to 100 parts by weight of the polyvinyl acetal resin.

The phosphoric acid ester compound to be used in the invention may include, for example, a trialkyl phosphate, a trialkoxyalkyl phosphate, a triaryl phosphate, and an alkyl aryl phosphate, and here, "alkyl" means an alkyl group having 1 to 12 carbon atoms and "aryl" means an aromatic hydrocarbon group optionally substituted with a substituent (e.g. a phenyl group optionally substituted with a substituent such as a lower alkyl having 1 to 4 carbon atoms and a lower alkoxy having 1 to 4 carbon atoms). More specific examples of the above-mentioned phosphoric acid ester compound are trioctyl phosphate, triisopropyl phosphate, tributoxyethyl phosphate, tricresyl phosphate, and isodecylphenyl phosphate.

The content of the phosphoric acid ester compound is 5 parts by weight or less, usually 0.001 to 5 parts by weight, to 100 parts by weight of the polyvinyl acetal resin.

The polyvinyl acetal resin to be used in the present invention is preferably those having an average acetalization degree of 40 to 75% by mole. If it is lower than 40% by mole, the compatibility with a plasticizer is decreased and it sometimes becomes difficult to mix a plasticizer in an amount needed for surely attaining penetration resistance. If it exceeds 75% by mole, the mechanical strength of the color interlayer film in the resultant laminated glass may be lowered, and it takes a long reaction time to obtain the resin, which is undesirable in terms of the process. It is more preferably 60 to 75% by mole and even more preferably 64 to 71% by mole.

The above-mentioned polyvinyl acetal resin is used preferably as plasticized polyvinyl acetal resin with a plasticizer.

With respect to the above-mentioned plasticized polyvinyl acetal resin, those which comprise 30% by mole or less of a vinyl acetate component are preferable. If it exceeds 30% by mole, blocking is easily caused at the time of producing the resin and it makes the production difficult. It is preferably 19% by mole or less.

The above-mentioned plasticized polyvinyl acetal resin comprises a vinyl acetal component, a vinyl alcohol component, and a vinyl acetate component, and each amount of these components can be measured, for example, by "Polyvinyl Butyral Test Method", JIS K6782 and nuclear magnetic resonance method (NMR).

In the case where the above-mentioned polyvinyl acetal resin is other than polyvinyl butyral resin, the amount of the remaining vinyl acetal component can be calculated by measuring each amount of the vinyl alcohol component and the vinyl acetate component and subtracting the amounts of both components from 100.

The above-mentioned polyvinyl acetal resin can be produced by a conventionally known method. For example, a method may be carried out as follows: a polyvinyl alcohol is dissolved in warm water and the resulting aqueous solution is kept at the predetermined temperature, for instance, at 0 to 95° C., preferably 10 to 20° C. and mixed with a necessary acid catalyst and an aldehyde to promote acetalization reaction under stirring condition. Next, the reaction temperature is raised to 70° C. for aging to complete the reaction and after that, neutralization, water washing, and drying steps are carried out to obtain a powder of a polyvinyl acetal resin.

As a polyvinyl alcohol which is served as the above-mentioned raw material, those having an average polymerization degree of 500 to 5000 are preferable and those having an average polymerization degree of 1000 to 2500 are more preferable. If the average polymerization degree is lower than 500, the penetration resistance of the resultant laminated glass may be decreased in some cases. If the average polymerization degree exceeds 5000, the formability of the resin film sometimes becomes difficult and the strength of the resin film may becomes too strong.

Since it is preferable to set the amount of the vinyl acetate component of the obtained polyvinyl acetal resin to be not higher than 30% by mole, the saponification degree of the above-mentioned polyvinyl alcohol is preferably 70% by mole or higher. If it is lower than 70% by mole, the transparency and heat resistance of the resin may be decreased and also the reactivity may be decreased in some cases. It is more preferably 95% by mole or higher. The average polymerization degree and saponification degree of the above-mentioned polyvinyl alcohol can be measured, for example, according to "Polyvinyl Alcohol Test Method", JIS K6726. The above-mentioned aldehyde includes preferably an aldehyde having 3 to 10 carbon atoms. If the number of carbon atoms of the aldehyde is less than 3, sufficient resin film formability cannot be obtained in some cases. If the number of carbon atoms of the aldehyde exceeds 10, the reactivity of acetalization is decreased, and blocks of the resin are easily formed during the reaction, resulting in a tendency of difficult resin synthesis.

The above-mentioned aldehyde is not particularly limited and may include, for example, aliphatic, aromatic, and alicyclic aldehydes such as propionaldehyde, n-butyl aldehyde, isobutyl aldehyde, valeraldehyde, n-hexylaldehyde, 2-ethylbutyl aldehyde, n-heptyl aldehyde, n-octyl aldehyde, n-nonyl aldehyde, n-decyl aldehyde, benzaldehyde, and cinnamaldehyde. Preferable aldehydes include, for example, aldehydes having 4 to 8 carbon atoms, such as n-butyl aldehyde, n-hexyl aldehyde, 2-ethylbutyl aldehyde, and n-octyl aldehyde. Since use of n-butyl aldehyde having 4 carbon atoms gives polyvinyl acetal resin whose use for resin films gives strong adhesion and excellent weather resistance, and makes the resin production easy and therefore, n-butyl aldehyde is more preferable. The aldehydes may be used alone, or two or more of them may be used in combination.

As the infrared ray shielding agent to be used in the present invention, for example, metal fine particles or organic infrared ray absorbents can be exemplified.

Examples of the above-mentioned metal fine particles include various kinds of metals such as Sn, Ti, Si, Zn, Zr, Fe, Al, Cr, Co, Ce, In, Ni, Ag, Cu, Pt, Mn, Ta, W, V as well as Mo; various kinds of oxides such as $SnO_2$, $TiO_2$, $SiO_2$, $ZrO_2$, ZnO, $Fe_2O_3$, $Al_2O_3$, FeO, $Cr_2O_3$, $CeO_2$, $In_2O_3$, NiO, MnO, and CuO; nitrides such as TiN and AlN, or nitride oxides; sulfides such as ZnS; doped materials such as 9 wt % $Sb_2O_3$-$SnO_2$ (ATO: manufactured by Sumitomo Osaka Cement, Co., Ltd.) and F-$SnO_2$; and compounded oxides such as $SnO_2$-10 wt % $Sb_2O_3$ and $In_2O_3$-5 wt % $SnO_2$ (ITO: manufactured by Mitsubishi Materials Corp.). Among them, ATO and ITO are particularly preferable since they satisfy the requirements for use for automobiles.

The content of the above-mentioned infrared ray shielding agent is usually 0.001 to 10 parts by weight to 100 parts by weight of the polyvinyl acetal, although it depends on the type of the infrared ray shielding agents.

The coloring agent to be used in the present invention is not particularly limited, and general purpose materials such as color toners, pigments, dyes and the like may be used. For example, as the color toners, green, black, blue, red toners can be exemplified, and they may be used alone or in the form of their mixture.

Also, as the pigments, inorganic pigments such as carbon black, and titanium white; nitro- or nitroso-type pigments; azo type pigments; and phthalocyanine type pigments can be exemplified, and as the dyes, azo type dyes, anthraquinone type dyes, and phthalocyanine type dyes can be exemplified.

The content of the above-mentioned coloring agent is not particularly limited, and may be approximately in an amount usually used for the color interlayer film for laminated glasses and may be properly determined in accordance with an aimed color.

The resin composition of the present invention may contain conventionally known additives such as an ultraviolet absorbent, a plasticizer, an antioxidant, a photostabilizer, and a surfactant other than the above-mentioned components.

The above-mentioned ultraviolet absorbent may include, for example, benzotriazole derivatives such as 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, and 2-(2'-hydroxy-3',5'-di-tert-amylphenyl)benzotriazole; benzophenone derivatives such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone; and cyanoacrylate derivatives such as 2-ethylhexyl-2-cyano-3,3'-diphenyl acrylate and ethyl-2-cyano-3,3'-diphenyl acrylate.

As the above-mentioned plasticizer, there can be used a conventionally known plasticizer used for this kind of interlayer films, including plasticizers such as organic esters (e.g. monobasic acid esters and polybasic acid esters).

Among the above-mentioned monobasic acid esters, preferable example is glycol type esters obtained by the reaction of triethylene glycol with an organic acid such as butyric acid, isobutyric acid, caproic acid, 2-ethylbutyric acid, heptanoic acid, n-octanoic acid, 2-ethylhexanoic acid, pelargonic acid (n-nonanoic acid), and decanoic acid. Additionally, esters of tetraethylene glycol or tripropylene glycol with the above-mentioned organic acids may also be used.

Preferable examples of the above-mentioned polybasic acid esters include esters of organic acids such as adipic acid, sebacic acid, and azelaic acid with straight chain or branched alcohols having 4 to 8 carbon atoms.

Specific examples of the above-mentioned organic ester type plasticizers include triethylene glycol di-2-ethylbutylate, triethylene glycol di-2-ethylhexoate, triethylene glycol dicaprylate, triethylene glycol di-n-octoate, triethylene glycol di-n-heptoate, and tetraethylene glycol di-n-heptoate and further dibutyl sebacate, diocty azelate, and dibutylcarbitol adipate.

In addition, ethylene glycol di-2-ethylbutylate, 1,3-propylene glycol di-2-ethylbutylate, 1,4-propylene glycol di-2-ethylbutylate, 1,4-butylene glycol di-2-ethylbutylate, 1,2-butylene glycol di-2-ethylenebutylate, diethylene glycol di-2-ethylbutylate, diethylene glycol di-2-ethylhexoate, dipropylene glycol di-2-ethylbutylate, triethylene glycol di-2-ethylpentoate, tetraethylene glycol di-2-ethylbutylate, and diethylene glycol dicaprylate can also be used as the plasticizer.

The amount of the above-mentioned plasticizer is preferably 20 to 70 parts by weight to 100 parts by weight of the polyvinyl acetal resin and more preferably 40 to 60 parts by weight. If it is less than 20 parts by weight, the penetration resistance of the laminated glass produced may be decreased, and if it exceeds 70 parts by weight, the plasticizer may bleed to increase the optical strain and decrease the transparency and adhesion property of the resin film in some cases.

Although the above-mentioned antioxidant is not particularly limited, it includes, for example, a phenol type antioxidant such as tert-butylhydroxytoluene (trade name: Sumilizer BHT, manufactured by Sumitomo Chemical Co., Ltd.) and tetrakis-[methylene-3-(3',5'-di-tert-butyl-4'-hydroxyphenyl) propionate]methane (Irganox 1010, manufactured by Ciba-Geigy Corp.).

As the above-mentioned photostabilizer, hindered amine type ones such as Adeka Stab LA-57 (trade name), manufactured by Asahi Denka Co., Ltd., can be exemplified.

As the above-mentioned surfactant, for instance, sodium lauryl sulfate and alkylbenzenesulfonic acid can be exemplified.

(Production Method)

Although there is no particular limitation to a production method of the color interlayer film for laminated glass of the present invention, the color interlayer film can be produced by incorporating a coloring agent, an infrared ray shielding agent and a phosphoric acid ester compound, and optionally other additives into a polyvinyl acetal resin, kneading the mixture uniformly, and forming the kneaded product into a sheet-like resin film by an extrusion method, a calender method, a press method, a casting method, an inflation method or the like.

In consideration of the minimum and necessary penetration resistance and weather resistance, the thickness of the entire color interlayer film for laminated glass of the present invention is, in its practical use, generally preferably in a range of 0.3 to 1.6 mm similar to the thickness of a common interlayer film for laminated glass.

As the glass plate to be used for the laminated glass, not only an inorganic transparent glass plate but also an organic transparent glass plate such as a polycarbonate plate and a poly(methyl methacrylate) plate may be used, though not particularly limited thereto.

The type of the above-mentioned inorganic transparent glass plate is not particularly limited, and various kinds of inorganic glasses such as float plate glass, polished plate glass, figured glass, mesh-inserted plate glass, wire-inserted plate glass, heat beam-absorbing plate glass, and colored plate glass can be exemplified, and they may be used alone, or two or more of them may be used in combination. Further, an inorganic transparent glass plate and an organic transparent glass plate may be laminated. The thickness of the glass may properly be selected based on the applications and is not particularly limited.

In order to produce the laminated glass of the present invention, a conventional method for the production of laminated glasses may be employed. For instance, a color interlayer film made of the resin film formed by the above-mentioned method is inserted between two transparent glass plates; the laminated product is put in a rubber bag and preliminarily adhered at about 70 to 110° C. under reduced pressure; and then actual adhesion is carried out at a temperature of about 120 to 150° C. under a pressure of about 10 to 15 kg/cm$^2$ by using an autoclave or a press to produce the laminated glass.

In the production method of the laminated glass, the above-mentioned color interlayer film obtained by forming a film of a plasticized polyvinyl acetal resin may be inserted between at least one pair of glass plates, and pressure-bonded under heating at a temperature of 60 to 100° C. while vacuum degassing is simultaneously carried out under reduced pressure. More specifically, the production method may be carried out by placing a laminate product of a glass plate/color interlayer film/glass plate in a rubber bag and pressure-bonding the laminated product under heating at a temperature of about 60 to 100° C. under a pressure of about 1 to 10 kg/cm$^2$ for 10 to 30 minutes in, for example, an autoclave while carrying out vacuum-degassing at about −500 to −700 mmHg for simultaneous degassing and adhesion.

In this production method, the adhesion force between the color interlayer film and the glass can be adjusted within a proper desired range by, as described above, limiting the temperature within a temperature range of 60 to 100° C. when pressure-bonded under heating, and properly setting various conditions such as pressure-bonding pressure, pressure bonding duration, and pressure reduction degree at the time of vacuum degassing within the above-mentioned ranges.

EXAMPLES

Hereinafter, the invention will be described in more detail with reference to Examples, however it is not intended that the invention be limited to the illustrated Examples.

Examples 1 to 6 and Comparative Example

A plasticizer-dispersed solution obtained by dispersing 0.28 parts by weight of tin-doped indium oxide (ITO) and 0.014 parts by weight of trioctyl phosphate in 10 parts by weight of triethyleneglycol diethylhexanoate (3GO); and 29 parts by weight of triethylene glycol diethylhexanoate (3GO), separately prepared, a color toner (the kinds of the colors used are as described in Table), an antioxidant, and an ultraviolet absorbent in each amount described in the following Table 1 were added to 100 parts by weight of polyvinyl butyral resin, followed by mixing with three rolls. The resultant mixtures were formed by heat press to obtain polyvinyl butyral resin sheets (color interlayer films) with a thickness of 0.76 mm.

TABLE 1

| Example No. | Resin (PVB) | Plasticizer (3GO) | Antioxidant (BHT) | Ultraviolet absorbent | Antistatic agent | Infrared ray shielding agent (ITO) | Phosphoric acid ester | Color toner (remark) |
|---|---|---|---|---|---|---|---|---|
| 1 | 100 | 39 | 0.4 | 0.4 | 0.3 | 0.28 | 0.014 | 0.099 (green + black) |
| 2 | 100 | 39 | 0.84 | 0.84 | 0.32 | 0.28 | 0.014 | 0.099 (green + black) |
| 3 | 100 | 39 | 0.4 | 0.4 | 0.3 | 0.28 | 0.014 | 0.08 (black + blue + red) |
| 4 | 100 | 39 | 0.84 | 0.84 | 0.32 | 0.28 | 0.014 | 0.08 (black + blue + red) |
| 5 | 100 | 39 | 0.4 | 0.4 | 0.3 | 0.28 | 0.014 | 0.679 (black + blue + red) |
| 6 | 100 | 39 | 0.84 | 0.84 | 0.32 | 0.28 | 0.014 | 0.679 (black + blue + red) |
| Comparative Example | 100 | 39 | 0.2 | 0.2 | 0.3 | 0 | 0 | 0.703 (black + blue + red) |

(remark)
green means a green toner,
black means a black toner,
blue means a blue toner, and
red means a red toner.

Test Example

According to the following test methods, haze values of the polyvinyl butyral resin sheets obtained in the above-mentioned Examples 1 to 6 and Comparative Example as they were or while being sandwiched with clear glass and at the same time light transmittance of the resin sheets were measured. The test results are shown in the following Tables 2 and 3.

(Test Method)
1. Measurement of the haze value:
The measurement was carried out by using an integrating turbidimeter after 24 hours from the time when color interlayer films were immersed in water at 23° C. as they were or while being sandwiched with clear glass.
2. Measurement of the light transmittance:
The following measurement and evaluation were carried out for the resultant laminated glasses.
The transmittance was measured for the light with wavelength in a range of 340 to 2100 nm by a spectrophotometer (Self-recording type 340 Model, manufactured by Hitachi Ltd.) and visible light transmittance, sunlight transmittance Ts 2100, color tone and the like were measured according to JIS R3106.

TABLE 2

| | Haze value (AVE) | | Heat shielding property | | | |
|---|---|---|---|---|---|---|
| Example No. | Film alone | Sandwiched by clear glass | Ts2100 (%) | T (1550 nm) (%) | T (850 nm) (%) | Y value of light A |
| 1 | 42.9 | 31.3 | 61.5 | 14.2 | 69.0 | 79.0 |
| 2 | 38.0 | 35.0 | 60.4 | 12.0 | 68.4 | 78.3 |
| 3 | 39.0 | 30.8 | 57.6 | 12.5 | 67.2 | 72.8 |
| 4 | 39.9 | 27.3 | 57.0 | 12.1 | 66.9 | 72.4 |
| 5 | 41.6 | 33.6 | 26.6 | 10.0 | 39.4 | 20.8 |
| 6 | 45.7 | 36.2 | 26.1 | 9.5 | 39.1 | 20.3 |
| Comparative Example | 89.6 | 88.9 | 34.7 | 57.5 | 42.8 | 21.6 |

TABLE 3

| | Color of the transmitted light | | | Color of the reflected light | | | |
|---|---|---|---|---|---|---|---|
| Example No. | L* (transmittance at 2° of light A) | a* (transmittance at 2° of light A) | b* (transmittance at 2° of light A) | Reflectance Y1 (at 2° light C) | L* (reflectance at 2° of light A) | a* (reflectance at 2° of light A) | b* (reflectance at 2° of light A) |
| 1 | 91.2 | −1.7 | 2.4 | −3.7 | 33.9 | −1.3 | −0.8 |
| 2 | 90.9 | −1.8 | 2.9 | −2.6 | 33.5 | −1.3 | −0.5 |
| 3 | 88.4 | −3.4 | 1.3 | −6.5 | 32.6 | −2.5 | −1.2 |
| 4 | 88.2 | −3.5 | 1.6 | −6.5 | 32.9 | −2.5 | −1.2 |

TABLE 3-continued

| | Color of the transmitted light | | | Color of the reflected light | | | |
|---|---|---|---|---|---|---|---|
| Example No. | L* (transmittance at 2° of light A) | a* (transmittance at 2° of light A) | b* (transmittance at 2° of light A) | Reflectance Y1 (at 2° light C) | L* (reflectance at 2° of light A) | a* (reflectance at 2° of light A) | b* (reflectance at 2° of light A) |
| 5 | 52.7 | −0.9 | −5.6 | 0.1 | 28.3 | 1.2 | −0.3 |
| 6 | 52.2 | −0.8 | −5.4 | 0.0 | 28.2 | 1.1 | −0.3 |
| Comparative Example | 53.6 | −2.6 | −7.3 | −2.8 | 27.6 | 0.5 | −0.7 |

As can be understood from the above Tables 2 and 3, even if the color interlayer films of the present invention are color interlayer films having a light transmittance exceeding 50%, they are remarkably excellent in the haze values as compared with that of the comparative film, and preventive against whitening. Also, it can be understood that even if the color interlayer films of the present invention are color interlayer films having a light transmittance exceeding 50%, they can keep low infrared ray transmittance since infrared rays are remarkably shielded by the infrared ray shielding agent.

INDUSTRIAL APPLICABILITY

The laminate glass produced by using the color interlayer film for laminated glass in accordance with the present invention is useful for window glass of automobiles and buildings.

The invention claimed is:

1. A color interlayer film for laminated glass, comprising a resin composition containing a polyvinyl acetal resin, a coloring agent, an infrared ray shielding agent, and a plasticizer characterized in that the resin composition further contains a phosphoric acid ester compound at a ratio of 5 parts by weight or less to 100 parts by weight of the polyvinyl acetal resin, wherein the plasticizer is triethylene glycol di-2-ethylhexanoate and the amount of the plasticizer is 20 to 70 parts by weight to 100 parts by weight of the polyvinyl acetal resin, and the phosphoric acid ester compound is at least one selected from the group consisting of trioctyl phosphate, triisopropyl phosphate, tributoxyethyl phosphate, tricresyl phosphate and isodecylphenyl phosphate.

2. The color interlayer film for laminated glass according to claim 1, wherein the content of the phosphoric acid ester compound is 0.001 to 5 parts by weight to 100 parts by weight of the polyvinyl acetal resin.

3. A laminated glass, characterized in that the color interlayer film for laminated glass according to claim 1 intervenes between at least one pair of glass plates.

4. A laminated glass, characterized in that the color interlayer film for laminated glass according to claim 2 intervenes between at least one pair of glass plates.

* * * * *